Oct. 21, 1958   F. C. LANDRUM ET AL   2,856,936
PEANUT COMBINE
Filed Sept. 19, 1956   2 Sheets-Sheet 1
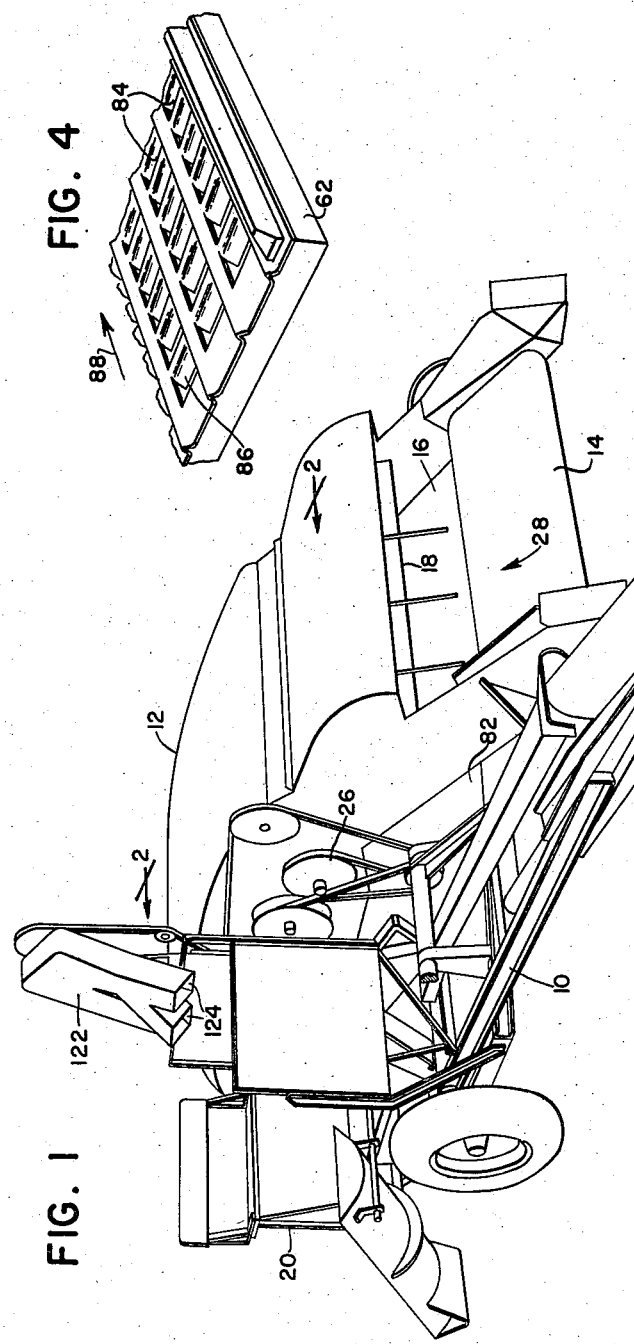
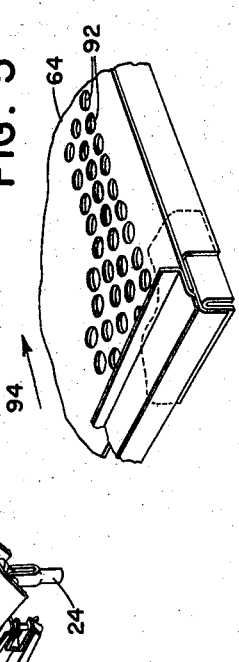
*INVENTORS*
F.C.LANDRUM &
R.L.ANDERSON

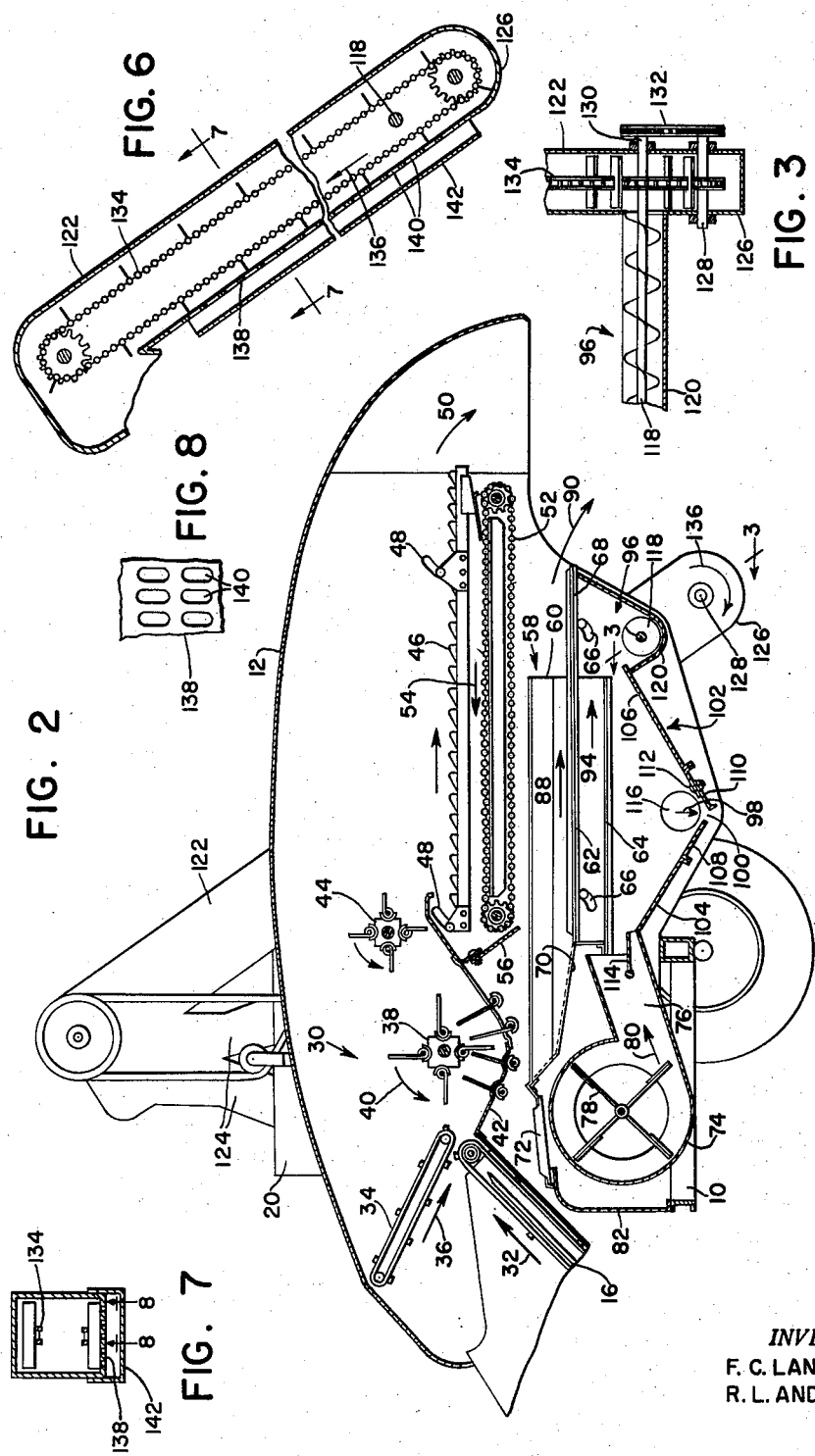

United States Patent Office 2,856,936
Patented Oct. 21, 1958

2,856,936

PEANUT COMBINE

Frank C. Landrum, Chamblee, Ga., and Ralph L. Anderson, East Moline, Ill., assignors, by mesne assignments, to Deere & Company, a corporation of Delaware Application September 19, 1956, Serial No. 610,782

1 Claim. (Cl. 130—30)

This invention relates to a combine and more particularly to such machine especially adapted for the harvesting and threshing of peanuts and similar crops. More particularly, the invention relates to mechanism for producing a peanut combine by utilizing the basic structure of a grain combine from which certain components have been removed.

The invention finds particular utility in the harvesting of windrowed peanuts rather than peanuts in stacks or piles and in this respect special provision is made for ridding the harvested peanuts of the substantial quantities of dirt or earth unavoidably taken in or accumulated during the harvesting operation, which may be accomplished in any well known manner, such as digging the peanuts from the soil by sweeps and the like. With substituted components made according to the present invention, it is found that the basic body structure of a conventional grain combine furnishes an adequate foundation on which to build the peanut machine. Among the changes achieved is the substantially complete removal of the grain threshing and grain separating mechanism and the replacement thereof by improved peanut threshing and peanut separating means. Because the picking up of peanuts entails the delivery to the threshing and separating mechanism of a conglomerate accumulation of peanuts, vines, leaves and dirt, the threshing mechanism is specially designed and it is therefore another object of the invention to provide improved peanut separating mechanism in which the dirt is sifted downwardly to a point or zone commonly occupied by the clean grain auger trough in a conventional combine. According to the invention, the clean grain auger trough is modified to afford a dirt discharge opening. This accordingly entails a further feature of the invention, which resides in a sieve which intercepts the peanuts while allowing the dirt to sift therethrough, and the sieve is reciprocated or otherwise activated so that the intercepted peanuts are delivered to what would ordinarily be the tailings auger in a grain combine. In short, the functions of the clean grain auger and the tailings auger are reversed in the peanut combine modification. Likewise, the action of the sieve is reversed, for in a grain combine the chaff and larger particles are intercepted by the sieve and the clean grain is allowed to sift to the clean grain auger.

It is another object of the invention to utilize the tailings elevator, which is in communication with the tailings auger, as an ultimate peanut delivery elevator. In this phase, a specific object resides in the improvement of the tailings elevator by an extension which prevents damage of the peanuts. In its over-all aspects, the invention affords a simple and economical peanut handling mechanism for utilizing a grain combine body structure, thus affording substantial savings in factory tooling, service, etc., all of material benefit to the user.

Still another object is to provide an improved elevator or conveyor in which an endless belt or chain is used as a drag conveyor and the flights thereof operate over a screened bottom for further separating dirt from the peanuts. In this respect, it is a still further object to provide an imperforate shield or chute beneath the perforate bottom to confine the discharge of dirt to a local zone.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Fig. 1 is a perspective of the improved peanut combine.

Fig. 2 is a longitudinal section as seen generally along the line 2—2 of Fig. 1.

Fig. 3 is a fragmentary section as seen along the line 3—3 of Fig. 2.

Fig. 4 is a fragmentary perspective, on an enlarged scale, of the peanut chaffer.

Fig. 5 is an enlarged fragmentary perspective of the peanut sieve.

Fig. 6 is a longitudinal fragmentary section through the elevator, illustrating the perforate bottom and the imperforate shield.

Fig. 7 is a transverse section on the line 7—7 of Fig. 6.

Fig. 8 is an enlarged fragmentary view, as seen along the line 8—8, illustrating a portion of the perforate bottom of the elevator.

Those familiar with the general subject will recognize, particularly in Fig. 1, basic combine body structure having the general outward appearance of a commercially popular grain combine, such as that illustrated in the U. S. patent to Anderson 2,367,990. The view illustrates the front and right hand portions of the machine and visible in the view are a mobile main frame 10, a separator body 12, pick-up or gathering means 14, feeding means 16, crop-spreading means 18, and a bagging platform 20. The main frame 10 includes a forwardly extending hitch 22 by means of which the machine may be connected to the drawbar of a conventional agricultural tractor, for example. Also visible in Fig. 1 is a forward portion of a rearwardly extending, shielded propeller shaft 24 by means of which the machine derives power from the power take-off of a tractor (not shown). Various elements of the drive for the machine are also illustrated generally in Fig. 1 at 26.

The pick-up means 14 may be of the type illustrated in the U. S. patent to Oehler 2,351,144, and this means operates as an endless belt to move in the direction of the arrow 28 to deliver peanuts and incidental material rearwardly to the feeder means 16. The spreading means or device 18, which is similar to that shown in the U. S. patent to Dort 2,729,048, evenly distributes the harvested material laterally across the feeder means or conveyor 16 for uniform feeding to threshing mechanism 30 (Fig. 2). The feeder or conveyor 16 moves so that its upper run travels in the direction of the arrow 32 and feeding is facilitated by an auxiliary feeder 34 which travels as indicated by the arrow 36. Consequently, the material is fed into the front end of the body 12.

The threshing mechanism 30, located adjacent to the forward end of the body 12, comprises a tined rotor 38 which rotates in the direction of the arrow 40 for cooperation with a tined and perforated concave 42. The threshing mechanism accomplishes the threshing of peanuts from the vines and also achieves the elimination of substantial quantities of dirt, major portions of which are discharged substantially directly downwardly. A cooperating tined beater 44 facilitates the rearward transfer of threshed peanuts and vines, together with incidental material, rearwardly onto walker means 46, as is not unconventional in grain threshing machines. This walker, as is typical, is cellular and accordingly permits the sifting therethrough of peanuts and smaller fragments of material, including dirt not separated in the threshing mechanism 30, while the particular shape of the walker, and the fore-and-aft reciprocation thereof as at 48, causes the vines to move rearwardly for discharge at the rear end of the body 12, generally in the zone of the arrow 50.

Peanuts and other material sifted through the walker means 46 drop onto the upper run of a conveyor 52 which moves in the direction of the arrow 54, whereupon this material is discharged downwardly past a curtain 56 to drop onto shoe means 58. This shoe means is made up of appropriate side members 60, a chaffer 62 and a sieve 64 next below the chaffer. The shoe means as a whole is activated by fore-and-aft reciprocation, as at 66, and operates to further separate the peanuts from the dirt and miscellaneous incidental material, such as leaves and vine fragments.

The fore-and-aft length of the shoe means is considerably shorter than that of the body 12 and the chaffer 62 is substantially co-extensive in fore-and-aft length with the conveyor 52. The sieve 64 is softer than the chaffer 62, wherefore the chaffer may be considered to have a rearward extension 68 projecting rearwardly of the rear end of the sieve. The front ends of the chaffer and sieve are substantially co-terminus and the chaffer has a solid forward extension 70 which affords part of dirt pan means including an additional forward extension 72. The dirt pan means 70—72 extends forwardly from the chaffer directly below the threshing means 30 and overlies pneumatic means comprising a fan housing 74, a discharge conduit 76 and a rotor 78. The rotor normally operates to direct a current of air upwardly and rearwardly through the sieve and chaffer for dislodging from these elements fragments of lighter material that are ultimately discharged at the rear end of the body.

The purpose of the dirt pan means portion 72 is to prevent the accumulation of dirt on the fan housing 74, and this function is augmented by an upright dirt shield 82 that is rigidly secured to a portion of the main frame 10. The shield 82 is wide enough to project somewhat beyond the ends of the fan housing and thus prevents the fan from taking in dirt through its open inlet ends. Since the dirt pan means 70—72 is secured to the shoe means 58, it will reciprocate with the shoe means and consequently a portion of the dirt will be agitated to drop forwardly ahead of the shield 82 and other portions of the dirt will move rearwardly over the pan portion 70 to sift through the chaffer 62 and sieve 64.

The nature of the chaffer 62 may be best seen in Fig. 4, wherein it is clear that the cellular structure of the chaffer affords a plurality of openings 84 of sufficient size to permit the sifting therethrough of peanuts and incidental relatively heavy material such as dirt, while the downwardly and forwardly directed flanges or wings 86 permit the current or blast of air from the fan 74 to blow relatively lighter material upwardly and rearwardly for discharge at the rear end of the body. The reciprocating movement of the chaffer is such that material not screened through the chaffer is moved rearwardly or in the direction of the arrow 88, and this material ultimately is discharged over the chaffer extension 68 as indicated by the arrow 90.

As indicated, the openings 84 in the chaffer 62 are sufficiently large to permit peanuts to pass therethrough. However, these peanuts are intercepted by the sieve 64, a representation of the nature of which will best be seen in Fig. 5. The sieve has therein a plurality of openings 92 which are small enough to prevent the passage of peanuts therethrough but are large enough to permit the passage of dirt downwardly therethrough. When the shoe is activated, as by the means at 66, the intercepted peanuts are caused to move rearwardly or in the direction of the arrow 94, ultimately dropping off into peanut-receiving means 96, whereas the dirt gravitates for discharge at 98 through an opening 100 formed in a bottom element 102.

This bottom element comprises front and rear portions 104 and 106. The front portion 104 inclines downwardly and rearwardly from a front end adjacent to the discharge conduit 76 of the fan to a terminal part 108 which defines one edge of the dirt discharge opening 100. The rear bottom element portion 106 inclines downwardly and forwardly from the peanut-receiving means 96 to a terminal part 110 which defines the opposite edge of the dirt discharge opening 100. The part 110 is adjustable, as indicated at 112, so that the size of the opening 100 can be varied. The purpose of providing the relatively confined opening at 100 rather than opening of the entire bottom of the body is to avoid the dissipation of air currents. Accordingly, relative adjustment of the terminal parts 108 and 110 is utilized to control these air currents, in addition to a typical wind board 114, which is also adjustable.

In a typical grain combine from which the peanut combine is constructed as disclosed here, the general zone of the bottom element 102 occupied by the terminal parts 108 and 110 is, in the grain combine, occupied by a clean grain auger. The trough embracing this auger from below is removed and replaced by the parts 108 and 110. Opposite side walls of the body through which the auger would normally extend are appropriately closed or blocked off by suitable closure plates, one of which is visible at 116 in Fig. 2.

Also, in a conventional grain combine body on which the present machine is preferably based, the peanut-receiving means 96 is the tailings auger 118 and tailings auger trough 120, which normally lead transversely of the machine to a tailings elevator 122. However, in the rebuilding, the tailings auger now becomes a peanut-conveying auger and the tailings elevator 122 becomes a peanut-delivery elevator, leading via modified branches 124 to the bagging platform 20, which may be equipped with suitable bagging devices (not shown) for bagging the delivered peanuts. In the typical grain combine, the tailings elevator 122 (here the peanut delivery elevator) would return un-cleaned grain to the threshing mechanism for rethreshing or re-cleaning, but here the purpose is entirely different.

As best seen in Fig. 3, the auger trough 120 leads into the elevator 122, which elevator includes a lower extension 126 in which a short transverse shaft 128 is journaled. The auger 118 has its shaft 130 extended to furnish means for driving the shaft 128, as at 132. A flighted chain 134 within the elevator 122 is driven in the direction of the arrow 136 (Fig. 2) to convey peanuts to the delivery branches 124. Inasmuch as the shaft 128 is located in the depending extension 126, the transfer of peanuts from the auger 118 to the elevator 122 prevents damage to the peanuts, since they cannot be cracked or crushed between the chain 134 and its associated sprocket.

The elevator 122 is constructed so that the lower run of the chain 134 travels in a direction of the arrow 136 and in so doing, the flights on the chain drag the peanuts upwardly over a perforate or screened bottom 138, the openings in which, as indicated at 140 in Fig. 8, are preferably elongated. The function of this structure is that as the peanuts are conveyed upwardly, any dirt not removed previously will sift through the openings 140 to be discharged externally of the conveyor. In order to localize the discharged dirt and thereby prevent clouds of dust from enveloping the machine, an imperforate shield or chute 142 is added, the discharged dirt thereby gravitating and escaping at the lower end of the conveyor.

The operation of the mechanism has been covered generally in connection with the description thereof and it is therefore deemed necessary to cover the operation only briefly.

As the machine advances, the peanuts, vines, dirt and incidental material are picked up by the pick-up means 14 and transferred rearwardly to the feeder means 16 for ultimate delivery to the threshing mechanism 30. During the threshing action, and as a result thereof, dirt drops through the concave 42 onto the dirt pan means 70—72 and the peanuts and vines are moved rearwardly, with the assistance of the beater 44, onto the walker 46. As the walker is activated, the vines move rearwardly for discharge at 50 and the dirt and peanuts move down to the conveyor 52 for ultimate transfer to the shoe 58. As the shoe reciprocates, the front portion 72 of the dirt pan means causes concave-discharged dirt to drop forwardly over the shield 82 so that it will not accumulate on the fan housing 74. Portions of the dirt discharged at the rearward part of the concave fall on the rear dirt pan portion 70 and pass through the chaffer 62 to the sieve 64. Peanuts and dirt sifted through the chaffer 62 will of course reach the sieve 64, which will intercept the peanuts and cause them to be transferred to the peanut-receiving means 96 while the dirt is sifted downwardly for discharge at 98 through the discharge opening 100. Material intercepted by the chaffer will be delivered off of the chaffer extension 68 at 90, it being noted that the chaffer extension overlies the peanut-receiving means 96 so that the chaffer-intercepted material is not commingled with peanuts in the peanut-receiving means. The peanuts are ultimately delivered to the elevator 122 and are bagged at 124 or otherwise accumulated.

The principal feature of the present invention is that it utilizes the basic construction of a conventional grain combine and thus eliminates the necessity for designing and building an entirely new machine especially equipped for handling peanuts. Other features and advantages of the invention, not categorically enumerated herein, will undoubtedly occur to those versed in the art, as will many modifications and alterations in the preferred embodiment disclosed, all of which may be achieved without departure from the spirit and scope of the invention.

What is claimed is:

In a peanut combine converted from a typical grain combine of the type including threshing means, walker means behind the threshing means, a shoe beneath the walker means for sifting grain from chaff, a bottom trough beneath the shoe for receiving grain, a tailings trough at the rear of the shoe for receiving grain and chaff from the shoe to be returned to the threshing means, and collecting means external to and independent of the threshing means, the improvement comprising: a substitute chaffer for the shoe for sifting peanuts and dirt downwardly and for causing larger unwanted material to move rearwardly over and beyond the tailings trough; a substitute sieve for the shoe and disposed beneath and for receiving dirt and peanuts from the chaffer and constructed to sift dirt downwardly while intercepting peanuts and causing said peanuts to move to the tailings trough; means providing an opening in the bottom trough for the gravitational exit of dirt; and means for conveying the peanuts from the tailings trough directly to the collecting means.

References Cited in the file of this patent

UNITED STATES PATENTS

| | | |
|---|---|---|
| 149,741 | Geiser | Apr. 14, 1874 |
| 331,967 | Hawley | Dec. 8, 1885 |
| 502,619 | Crocker | Aug. 1, 1893 |
| 792,795 | Schauer | June 20, 1905 |
| 809,097 | Delk | Jan. 2, 1906 |
| 2,397,375 | Scranton | Mar. 26, 1946 |
| 2,454,156 | Good | Nov. 16, 1948 |
| 2,804,077 | Anderson | Aug. 27, 1957 |